(12) United States Patent
Lee et al.

(10) Patent No.: US 11,157,146 B2
(45) Date of Patent: Oct. 26, 2021

(54) DISPLAY APPARATUS AND CONTROL METHOD THEREOF FOR PROVIDING PREVIEW CONTENT

(71) Applicant: SAMSUNG ELECTRONICS CO., LTD., Suwon-si (KR)

(72) Inventors: Daehyun Lee, Suwon-si (KR); Suwon Seo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/743,093

(22) Filed: Jan. 15, 2020

(65) Prior Publication Data

US 2020/0233543 A1 Jul. 23, 2020

(30) Foreign Application Priority Data

Jan. 17, 2019 (KR) .................. 10-2019-0006329

(51) Int. Cl.
| | |
|---|---|
| *G09G 5/00* | (2006.01) |
| *G06F 3/0482* | (2013.01) |
| *G06F 3/16* | (2006.01) |
| *G06F 3/0484* | (2013.01) |

(52) U.S. Cl.
CPC ........ *G06F 3/0482* (2013.01); *G06F 3/04845* (2013.01); *G06F 3/04847* (2013.01); *G06F 3/16* (2013.01)

(58) Field of Classification Search
CPC .. G06F 3/0482; G06F 3/0484; G06F 3/04845; G06F 3/04847; G06F 3/16; G06F 3/167; H04N 21/23439; H04N 21/251; H04N 21/47202; H04N 21/25825; H04N 21/4263; H04N 21/431; H04N 21/6582; H04N 21/4424; H04N 21/8549
See application file for complete search history.

(56) References Cited

U.S. PATENT DOCUMENTS

| | | | |
|---|---|---|---|
| 8,689,254 B2 | 4/2014 | Abraham et al. | |
| 9,064,276 B2* | 6/2015 | Hill | ............ G06Q 30/0601 |
| 9,842,258 B2 | 12/2017 | Zhao | |

(Continued)

FOREIGN PATENT DOCUMENTS

| | | |
|---|---|---|
| JP | 2018-88598 A | 6/2018 |
| KR | 10-2016-0053663 A | 5/2016 |

OTHER PUBLICATIONS

International Search Report and Written Opinion (PCT/ISA/210 and PCT/ISA/237), dated May 12, 2020 by International Searching Authority in International Application No. PCT/KR2020/000670.

*Primary Examiner* — Vijay Shankar
(74) *Attorney, Agent, or Firm* — Sughrue Mion, PLLC

(57) ABSTRACT

A display apparatus may include a display, a communicator including circuitry configured to communicate with a server, a user input unit including circuitry configured to receive a user input, and a processor. The processor may be configured to, based on a first user input, control the display to display a menu providing at least one image quality of a preview content that is selectable, receive a second user input of selecting the at least one image quality of the preview content, control the communicator to transmit a request for the preview content at the selected image quality to the server, and control the display to display an image based on the preview content received from the server.

18 Claims, 15 Drawing Sheets

(56) References Cited

U.S. PATENT DOCUMENTS

| | | | |
|---|---|---|---|
| 2001/0001160 A1* | 5/2001 | Shoff | H04N 5/44543 |
| | | | 725/51 |
| 2004/0181811 A1* | 9/2004 | Rakib | H04N 21/643 |
| | | | 725/122 |
| 2005/0166247 A1* | 7/2005 | Blackketter | H04N 21/4782 |
| | | | 725/112 |
| 2007/0067297 A1* | 3/2007 | Kublickis | G06Q 20/29 |
| 2008/0066102 A1 | 3/2008 | Abraham et al. | |
| 2009/0012935 A1* | 1/2009 | Beged-Dov | G06F 16/48 |
| 2010/0020238 A1 | 1/2010 | Kim et al. | |
| 2011/0069081 A1 | 3/2011 | Lee et al. | |
| 2014/0169484 A1 | 6/2014 | Jung et al. | |
| 2017/0054614 A1 | 2/2017 | Carter et al. | |
| 2017/0091831 A1* | 3/2017 | Langston | G06F 3/04842 |
| 2017/0262707 A1 | 9/2017 | Zhao | |
| 2017/0315772 A1 | 11/2017 | Lee et al. | |
| 2018/0199110 A1 | 7/2018 | Cormican et al. | |
| 2018/0239964 A1 | 8/2018 | Shetty et al. | |
| 2018/0332355 A1* | 11/2018 | Loveria, III | H04N 21/4438 |

* cited by examiner

DISPLAY APPARATUS AND CONTROL METHOD THEREOF FOR PROVIDING PREVIEW CONTENT

CROSS-REFERENCE TO RELATED APPLICATION(S)

This application is based on and claims priority under 35 U.S.C. § 119 to Korean Patent Application No. 10-2019-0006329, filed on Jan. 17, 2019 in the Korean Intellectual Property Office, the disclosure of which is incorporated by reference herein in its entirety.

BACKGROUND

1. Field

The disclosure relates to a display apparatus capable of displaying an image based on various image contents received from a server and a control method thereof, and more particularly to a display apparatus, which selects a preview image of a predetermined image content through a menu screen provided by a server, and receives and displays the selected preview image from the server before receiving the corresponding image content, and a control method thereof.

2. Description of Related Art

A display apparatus refers to a general apparatus which includes a communicator, a display panel and a processor, and displays an image on the display panel based on an image signal received through the communicator and processed by the processor. In general, the display apparatus includes various types of apparatuses, such as a television (TV), a monitor, a portable multimedia player, etc., and may include a separate external device according to operation modes. For example, when the display apparatus is the TV, the TV may receive an image signal for itself, or may receive an image signal processed by a set-top box.

An image signal provided to the display apparatus has a form based on a live channel mode or a video on demand (VOD) mode. The live channel mode refers to a mode that a typical broadcast signal transmitted from a broadcasting station, in which the broadcast signal includes broadcast content broadcasted in a timeslot previously fixed according to channels. The live channel mode is a provider-centered service type in which a user needs to view the broadcast content through the display apparatus in the fixed timeslot. Unlike the live channel mode, the VOD mode allows a user to receive and view desired content at a desired time. As an example of the VOD mode, there is a content streaming service of a streaming server.

The display apparatus accesses the streaming server through a network, and displays a streaming service screen provided in the form of a website by the server. The server prepares files corresponding to image qualities with respect to one content, and provides the files to be selectable according to the image qualities through the service screen. When a certain image quality is selected on the service screen, the display apparatus receives and displays the file corresponding to the selected image quality from the server.

However, it should be considered that the display apparatus may select and reproduce content at a certain image quality among different image qualities provided. For example, the display apparatus may reproduce or may not reproduce content at an image quality higher than or equal to a certain level due to apparatus performance, network environments, and the like factors. Furthermore, when there is a policy to impose different charges for a content streaming service according to image qualities, a higher image quality may be more expensive and a user may not choose to pay a higher price for the content. Therefore, it should be taken into account whether the display apparatus is able to reproduce content of higher image quality among many other factors for reproducing content at higher image quality.

The content streaming service has been providing a preview or trailer file for predetermined content. However, such preview or trailer file is merely a file that is provided for advertisement purposes, separately from the content itself. Therefore, when the preview file is reproduced, a user cannot determine the original quality of the content through the preview file.

Accordingly, based on the content being provided in different image qualities, a display apparatus and a server may provide the content so that a user can substantially experience the content with desired image quality.

SUMMARY

According to an embodiment, there is provided a display apparatus including a display; a communicator comprising circuitry configured to communicate with a server; a user input unit comprising circuitry configured to receive a user input; a processor configured to: based on a first user input, control the display to display a menu providing at least one image quality of a preview content that is selectable, receive a second user input of selecting the at least one image quality of the preview content, control the communicator to transmit a request for the preview content at the selected image quality to the server, and control the display to display an image based on the preview content received from the server.

The processor may be further configured to control the display to display the image based on the preview content having the selected image quality to be displayed on a full screen.

The second user input may select two or more image qualities of the preview content, and the processor may be further configured to control the display to display images based on preview contents of the two or more selected image qualities received from the server.

The processor may be further configured to: divide a screen of the display into a plurality of areas corresponding to a number of the selected image qualities, assign the preview contents having the selected image qualities to the plurality of areas, and control a part of the image based on the assigned preview content to be displayed on each of the plurality of areas.

The display apparatus may further include a hardware decoder configured to decode a first preview content, and the processor may be further configured to drive a software decoder and control the software decoder to decode a second preview content.

The processor may be configured to control the hardware decoder to process the first preview content having a relatively higher image quality among a plurality of preview contents.

The processor may be further configured to process the preview contents to be alternately decoded.

The processor may be further configured to output a sound corresponding to the preview content, and display the preview content with an interface for indicating whether the sound is output.

The processor may be further configured to display the menu with guide information about selectable image qualities.

The guide information may be generated based on a performance of the display apparatus or a network state between the display apparatus and the server.

According to another embodiment, there is provided a method of controlling a display apparatus. The method may include: based on a first user input, displaying a menu providing at least one image quality of a preview content that is selectable, receiving a second user input of selecting the at least one image quality of the preview content, transmitting a request for the preview content at the selected image quality, to a server, and displaying an image based on the preview content received from the server.

The displaying of the image based on the preview content may include using a full screen to display the image based on the preview content having the selected image quality.

The second user input may select two or more among the image qualities, and the displaying of the image based on the preview content further include displaying images based on preview contents of two or more selected image qualities.

The displaying of the images based on the preview contents may include: dividing a screen of the display into a plurality of areas corresponding to a number of the selected image qualities, assigning the preview contents having the selected image qualities to the plurality of areas, and controlling a part of the image based on the assigned preview content to be displayed on each of the plurality of areas.

The display apparatus may further include a hardware decoder configured to decode a first preview content, and the displaying of the images based on the preview contents may further include driving a software decoder to decode a second preview content.

The method may further include controlling the hardware decoder to process the first preview content having a relatively higher image quality among a plurality of preview contents.

The method may further include processing the preview contents to be alternately decoded.

The method may further include: outputting a sound corresponding to the preview content, and displaying the preview content with an interface for indicating whether the sound is output.

The method may further include displaying the menu with guide information about selectable image qualities.

The guide information may be generated based on performance of the display apparatus or a network state between the display apparatus and the server.

BRIEF DESCRIPTION OF THE DRAWINGS

The above and other aspects will become apparent and more readily appreciated from the following description taken in conjunction with the accompanying drawings, in which.

DETAILED DESCRIPTION

Below, embodiments will be described in detail with reference to accompanying drawings. Further, the embodiments described with reference to the accompanying drawings are not exclusive to each other unless otherwise mentioned, and embodiments may be selectively combined. The combination of embodiments may be discretionally selected and applied to realize the present disclosure by a person having an ordinary skill in the art.

In the description of the embodiments, an ordinal term, such as "first", "second", etc., may be used to describe a variety of elements, and the terms may be used for distinguishing one element from another element. The meanings of the elements may not be limited by the terms, and the terms may be also used for explaining the corresponding embodiment without limiting the disclosure.

Further, a term "at least one" among a plurality of elements in the disclosure may represent not only all the elements, but also each one of the elements, which excludes the other elements or all combinations of the elements.

Figure 1:
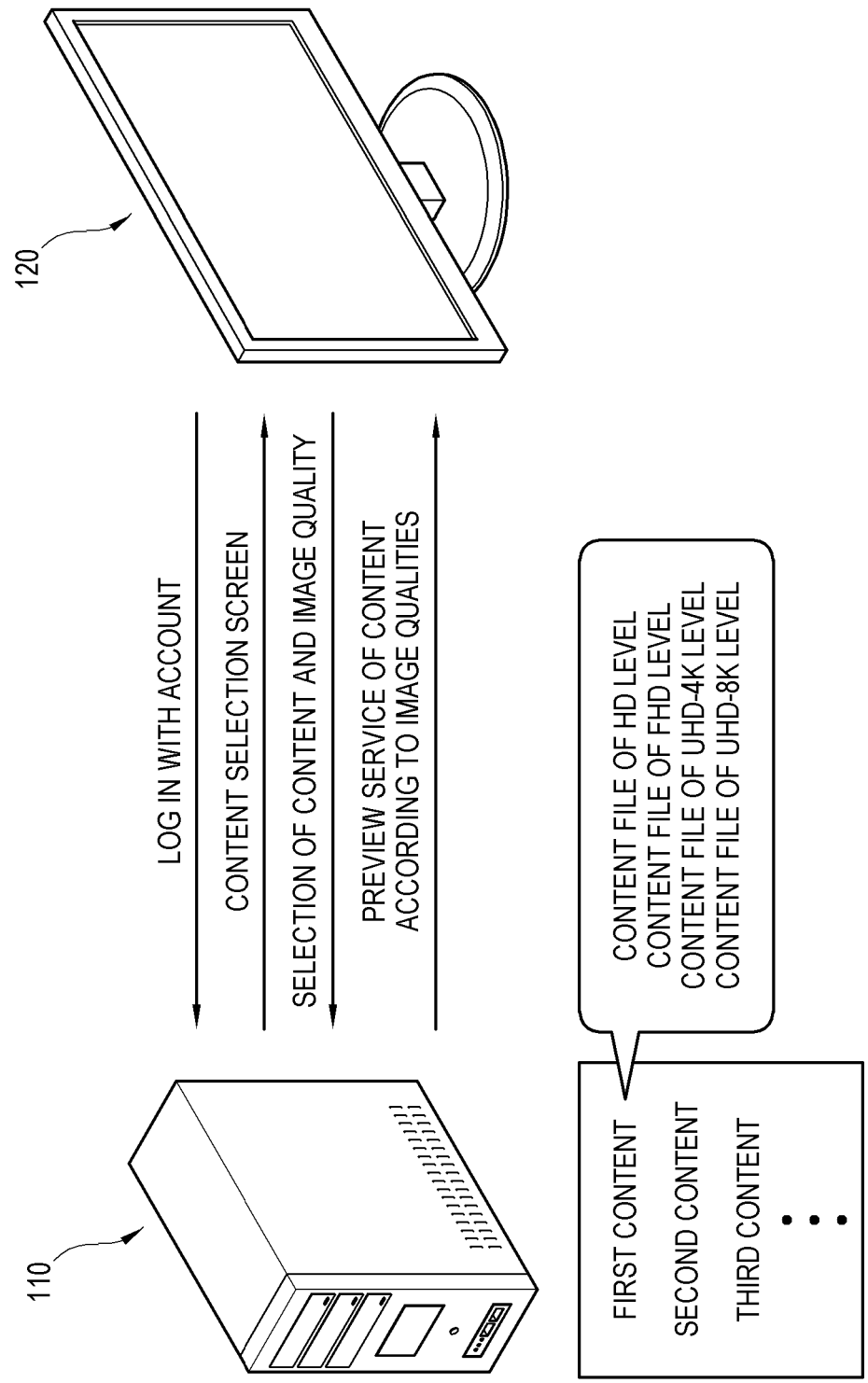
FIG. 1 illustrates a streaming mode between a server and a client according to an embodiment.

FIG. 1 illustrates a streaming mode between a server and a client according to an embodiment.

As shown in FIG. 1, a system according to an embodiment may include a server 110 and a client 120 which are connected and communicate with each other through a network. According to this embodiment, the server 110 is connected to one client 120. Alternatively, the server 110 may connect with a plurality of clients 120, and each of the plurality of clients 120 may have a configuration according to this embodiment. The network to which the server 110 and the client 120 are connected may include a wide area network (WAN) or a local area network (LAN), and a communication mode between the server 110 and the client 120 may include a wired communication mode, a wireless communication mode, or various communication modes where the wired communication mode and the wireless communication mode are combined.

The server 110 may store various kinds of contents, and provide content to the client 120 in response to a request from the client 120. According to this embodiment, there is one server 110, but there may be a plurality of servers 110 which may operate integrally with one another. For example, the server 110 may include a server that stores contents, and a server that acquires contents from a content server in response to a request from the client 120 and provides contents to the client 120.

The server 110 may include a streaming server that provides a content streaming service. The server 110 may store various kinds of content, such as a movie, a soap opera, a documentary, an animation, news, a comedy, etc. Further, the server 110 may store content files corresponding to a plurality of image qualities with respect to each content.

For example, the server 110 may be provided with a plurality of contents, such as first content, second content, third content, etc. For each content, the server 110 may store and provide not only a single content file, but a plurality of content files corresponding to various image qualities. For example, a plurality of content files may be provided with respect to a first content, and the plurality of content files may correspond to a plurality of image qualities, such as high definition (HD), full HD (FHD), ultra HD (UHD), 4K, UHD-8K, etc.

The server 110 may identify clients 120 according to user accounts or apparatus accounts. The server 110 may store a history of each client 120 based on the account information. When the streaming service is a paid service, there is a need to store a content purchase or use histories of clients 120 for each account. When the server 110 is accessed by the client 120 with a predetermined account, the server 110 may provide a content section screen or a content purchase screen to the client 120. In this case, the server 110 may show account-optimized information on the content selection screen, based on a use history of an account identified on the content selection screen.

Figure 2:
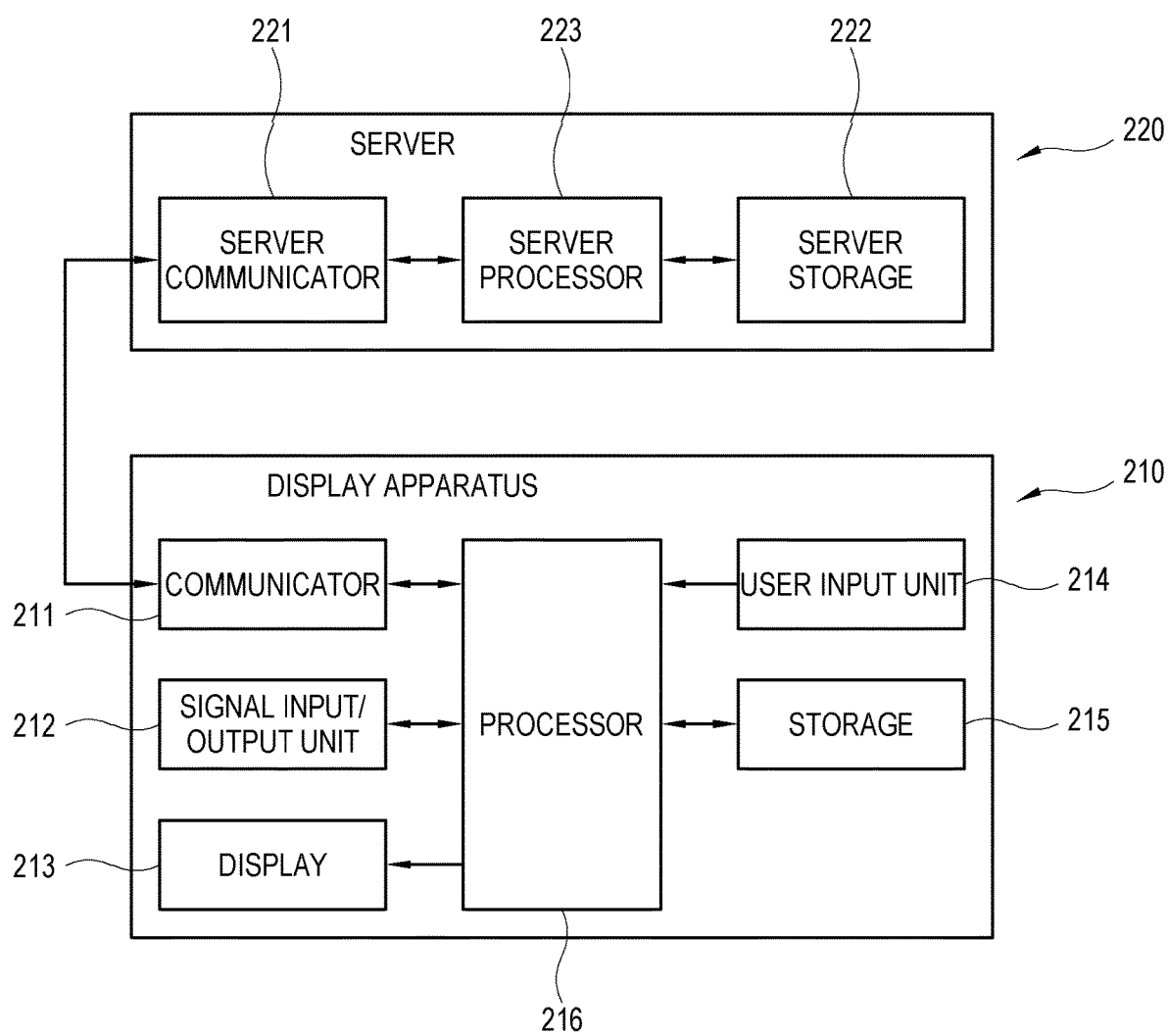
FIG. 2 is a block diagram of a server and a display apparatus according to an embodiment.

The client 120 may include a display apparatus 210 (as shown in FIG. 2) capable of displaying an image. The display apparatus 210 may include various apparatuses such as a television (TV), a monitor, a portable multimedia player, a wearable device, an electronic frame, etc. The display apparatus 210 may be configured to display an interface in which a user may log in with a predetermined account to the server 110, and then display the content selection screen provided from the server 110 based on the information stored in the server 110 with respect to the predetermined account. When a certain image quality is selected by a user for a content among a plurality of image qualities guided through the content selection screen of the display apparatus 210, the server 110 may provide a preview service having the selected image quality, for contents to the display apparatus 210. As the preview service, the display apparatus 210 may display preview images for a content corresponding to the selected one or more image qualities. Accordingly, the display apparatus 210 may transmit a request for content having image quality, for which the preview service has been provided, to the server 110, and receive and display the content having the image quality corresponding to the request.

FIG. 2 is a block diagram of a server and a display apparatus according to an embodiment.

As shown in FIG. 2, a display apparatus 210 may include a communicator 211, a signal input/output unit 212, a display 213, a user input unit 214, a storage 215, and a processor 216. The server 220 may include a server communicator 221, a server storage 222, and a server processor 223.

Below, the configuration of the display apparatus 210 will be described.

The communicator 211 may refer to an interactive communication circuit that may include at least one of a plurality of elements, such as a communication module, a communication chip, etc. corresponding to various wired and wireless communication protocols. For example, the communicator 211 may be embodied by a wireless communication module configured to perform wireless communication with an access point (AP) through Wi-Fi, or a local area network (LAN) card connected to a router or a gateway by a wire. For example, the communicator 211 may communicate with a server 220 on a network, thereby receiving a data packet from the server 220.

The signal input/output unit 212 is one-to-one or one-to-many connected to a set-top box, an optical media player, or the like external apparatus, thereby receiving or outputting data with regard to the corresponding external apparatus. The signal input/output unit 212 may include, for example, a high definition multimedia interface (HDMI) port, a display port, a universal serial bus (USB) port, and the like connectors or ports according to preset transmission standards.

The display 213 may include a display panel capable of displaying an image on a screen. The display panel is provided to have a light receiving structure, such as a liquid crystal type, or a self-emissive structure, such as an organic light emitting diode (OLED) type. The display 213 may include an additional element according to structures of the display panel. For example, when the display panel is the liquid crystal type, the display 330 may include a liquid crystal display panel, a backlight unit configured to emit light, a panel driving substrate configured to drive liquid crystal of the liquid crystal display panel, etc.

The user input unit 214 may include circuitry related to various input interfaces that may be controlled by a user to receive a user's input. The user input unit 214 may be variously configured according to the kinds of display apparatus 210, and may include, for example, a mechanical or electronic button, a remote controller separately connected to the display apparatus 210, a touch pad, a touch screen, etc.

The storage 215 may be accessed by the processor 216, and perform operations, such as reading, recording, modifying, deleting, updating, etc. for data processing. The storage 215 may include a flash memory, a hard disk drive (HDD), a solid state drive (SSD), a read only memory (ROM) and the like nonvolatile memory, in which data is retained regardless of whether power is supplied or not. The storage 215 may also include a buffer, a random access memory (RAM) and the like volatile memory to which processing data may be loaded.

The processor 216 may include one or more hardware processors achieved by a central processing unit (CPU), a chipset, a buffer, a circuit, etc., which may be mounted on a printed circuit board (PCB). Alternatively, the processor 216 may be designed as a system on chip (SoC). The processor 216 may include modules corresponding to various processes, such as a de-multiplexer, a decoder, a scaler, an audio digital signal processor (DSP), an amplifier, etc., and some or all of the modules may be achieved by the SoC. For example, a de-multiplexer, a decoder, a scaler, and the like module related to an image process may be achieved as an image processing SoC, and an audio DSP may be achieved as a chipset separated from the SoC.

The processor 216 may be configured to access and execute instructions to log in to the server 220 through the communicator 211, based on account information, such as user name and password, input by a user or previously stored in the storage 215. The processor 216 may be configured to control the display 213 to display a streaming service screen provided by the server 220, and transmit a request for a content selected on the streaming service screen to the server 220 through the communicator 211. When a requested content file streams from the server 220 to the communicator 211, the processor 216 may buffer the streamed content file in the storage 215, and processes the buffered content file so that the display 213 may display a content image.

Below, the configuration of the server 220 will be described.

The server communicator 221 may refer to an interactive communication circuit that may include at least one of a plurality of elements, such as a communication module, a communication chip, etc. corresponding to various wired and wireless communication protocols. The server communicator 221 may have access to the WAN, thereby communicating with various clients including the display apparatus 210 through the network.

The server storage 222 may be controlled by the server processor 223 to perform operations such as reading, recording, modifying, deleting, updating, etc. for data. The server storage 222 may include a flash memory, an HDD, an SSD, a buffer, a RAM, and the like nonvolatile and volatile memories. The server storage 222 may be configured to store various contents, and content files corresponding to different image qualities with respect to each content.

The server processor 223 may include one or more hardware processors embodied by a CPU, a chipset, a buffer, a circuit, etc. which may be mounted on a PCB, and may also be designed as an SoC. The server processor 223 may perform various processes in response to a request from the display apparatus 210, and transmit a processed result to the display apparatus 210. For example, the server processor 223 may transmit a content file stored in the server storage 222 to the display apparatus 210 through the server communicator 221 when a streaming request for the content file having specific image quality is received from the display apparatus 210 through the server communicator 221.

According to an embodiment, the display apparatus 210 may receive a user input selecting the content file corresponding to one image quality among the plurality of content files having the same content but different image qualities, and transmit a request for the selected content file to the server 220. However, the streaming service provided by the server 220 may impose different charges for the content according to different image qualities. For example, a content provider may charge a relatively higher price for a content having a higher image quality. In other words, with respect to the same content, FHD content may be more expensive than HD content; UHD-4K content may be more expensive than the FHD content; and UHD-8K content may be more expensive than UHD-4K.

Although it is generally preferable to stream and reproduce the content file having the highest image quality, a user may have to consider the image qualities of the content according to various factors such as a streaming environment of the display apparatus 210, a propensity of a user, etc.

For example, the display apparatus 210 may reproduce or may not reproduce UHD content of ultra-high image quality according to operation performance of the processor 216, support resolutions of the display 213, decoding performance of the decoder in the processor 216, and the like apparatus performance.

In addition, although the performance of the display apparatus 210 may be appropriate for the streaming of the content having the ultra-high image quality, the network between the server 220 and the display apparatus 210 may be unstable, and therefore the display apparatus 210 may have a relatively low rate of receiving data per unit time. As such, the streaming of the content having the ultra-high image quality to the display apparatus 210 may cause frequent buffering during reproduction of a content file, and therefore, it may be difficult for a user to normally view a content image.

Alternatively, according to a user's propensities, the user may not prefer a UHD-level image quality, and may determine that a less expensive FHD-level image quality is enough.

Taking such various factors into account, the display apparatus 210 according to an embodiment may operate as follows.

Figure 3:
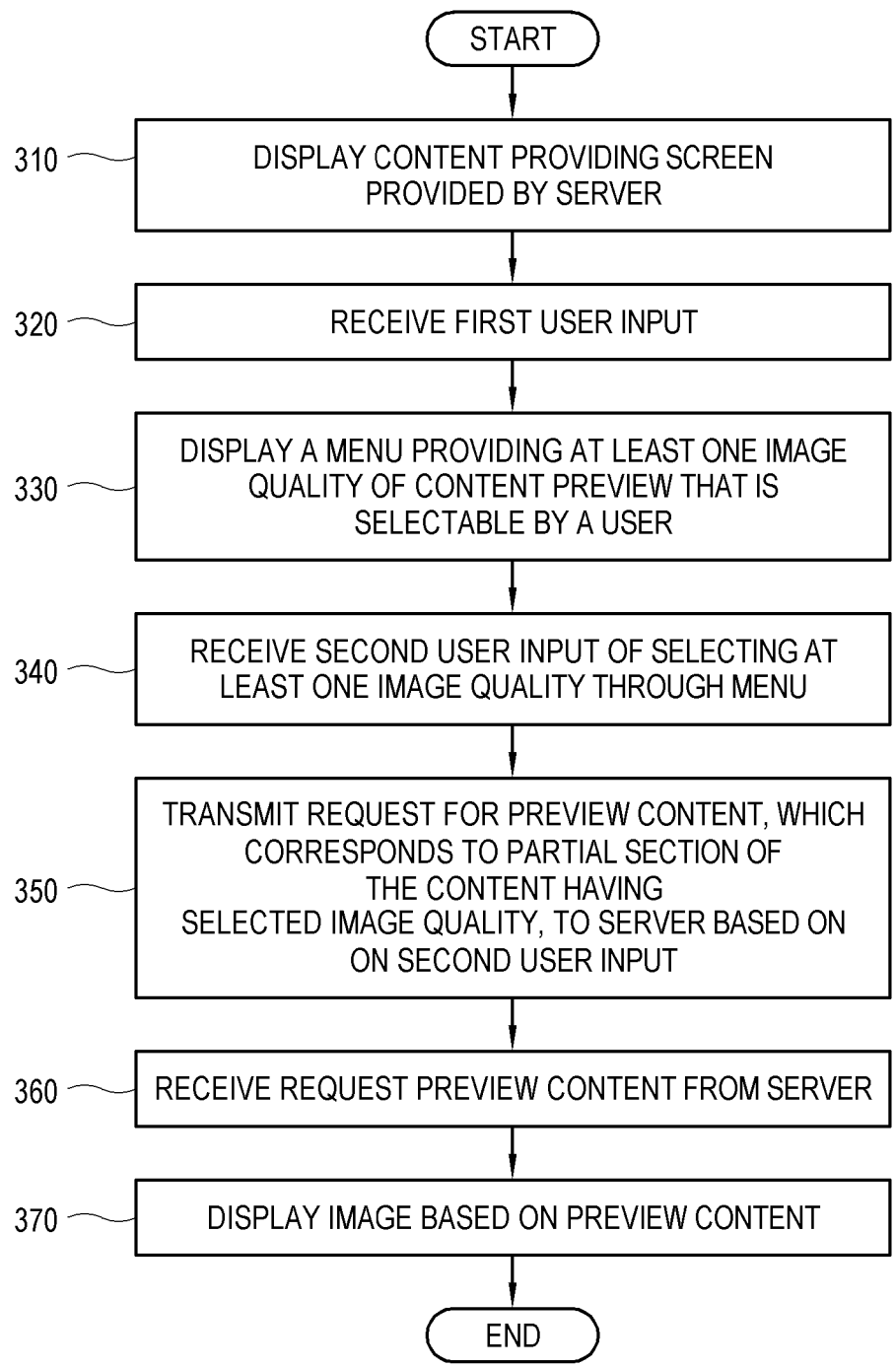
FIG. 3 is a flowchart of providing a file for a preview of content in a display apparatus according to an embodiment.

FIG. 3 is a flowchart of providing a file for a preview of content in a display apparatus according to an embodiment.

As shown in FIG. 3, the following operations are carried out by the processor of the display apparatus.

In operation 310, the display apparatus may access the server, and display a content providing screen provided by the server. The content providing screen may refer to a screen through which various contents provided by the server are selectable, and may include, for example, a screen of a content purchase and guide site for a content streaming service.

In operation 320, the display apparatus may receive a first user input to display a menu providing the preview content. Here, the preview content may refer to a kind of derivative content as a part of the original content, so as to give a user a sketch or summarized information and the like related to the original content.

In operation 330, the display apparatus may display a menu, through which different image qualities may be selected for the content based on the first user input. In other words, the content providing screen may include a menu that provides different options of image qualities for the user, so that the selected image quality may be displayed for the preview content. In operation 340, the display apparatus may receive a second user input of selecting at least one of the plurality of image qualities through the menu.

In operation 350, the display apparatus may transmit a request to the server for the preview content, which corresponds to a partial section of the entire content at the selected image quality, based on the second user input.

In operation 360, the display apparatus may receive the requested preview content from the server.

In operation 370, the display apparatus may display an image based on the received preview content.

Thus, the display apparatus according to an embodiment may provide a simple guide to a content and allow a user to recognize how a content having certain image quality may be reproduced, before the user selects the content. That is, the display apparatus allows a user to experience how a content having certain image quality is reproduced, so that the user may visually recognize and determine the content having a desired image quality. Therefore, a user may efficiently purchase or select a content, and thus, improving overall consumer satisfaction.

Below, an example of a content providing screen received from the server and displayed on the display apparatus will be described.

Figure 4:
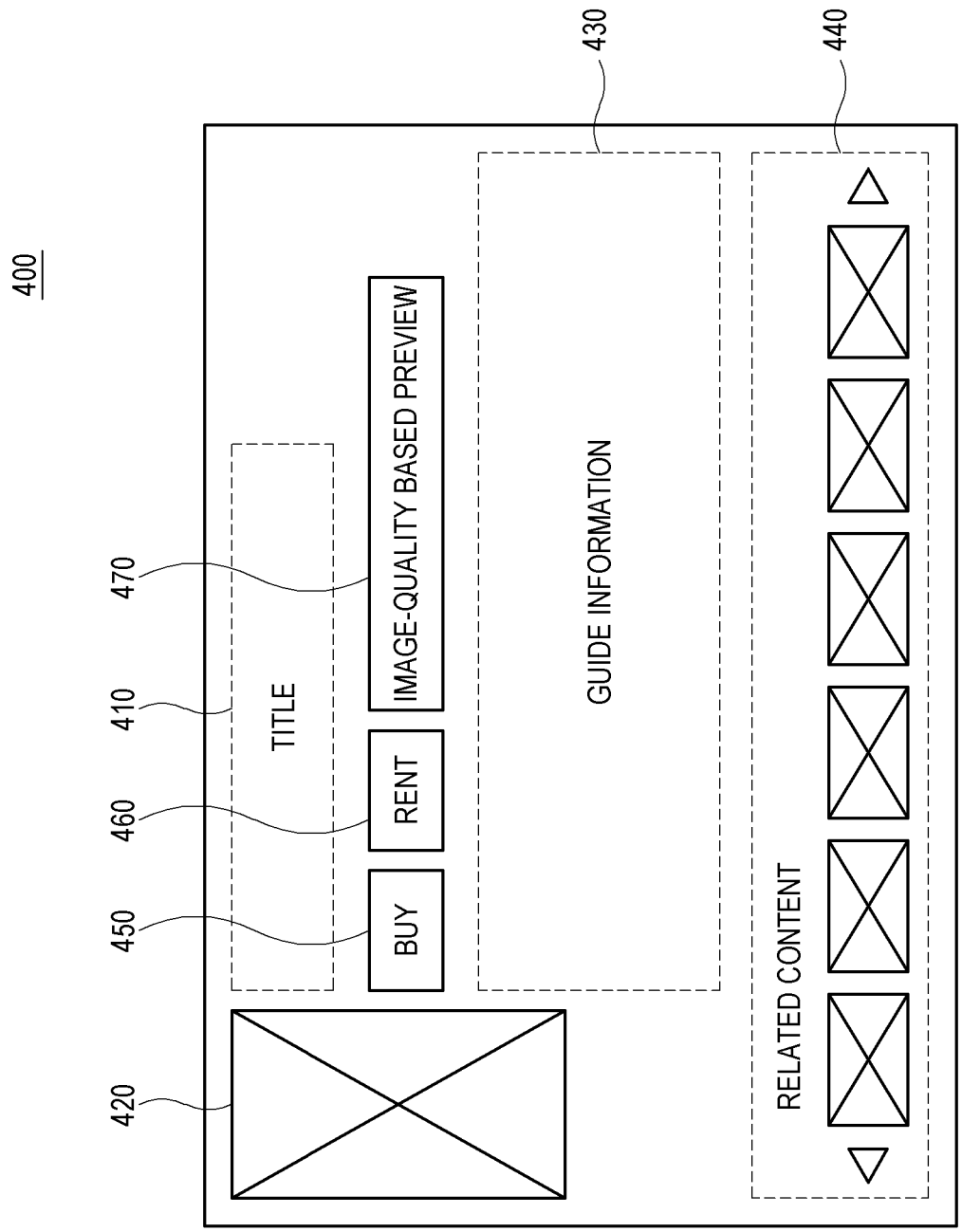
FIG. 4 illustrates a content providing screen displayed in a display apparatus according to an embodiment.

FIG. 4 illustrates a content providing screen displayed in a display apparatus according to an embodiment.

As shown in FIG. 4, the display apparatus may access the server and display a content providing screen 400 provided by the server. The content providing screen 400 provides various pieces of information about predetermined content, and various options related to the content. For example, the content providing screen 400 may include a title 410 of the content; screen information 420 such as a scene from the content, a poster of the content, etc.; guide information 430 of the content, such as a description, a summary, a rating, etc.; related-content guide information 440 such as a thumbnail image of another content related to the content to switch over to another content providing screen; etc.

Further, the content providing screen 400 may include a purchase button 450 for purchasing a content using an account. The content providing screen 400 may also include a rent button 460 for selecting content rental and an image-quality based preview button 470 for requesting viewing of a content preview having the image quality of the content. However the foregoing content providing screen 400 is merely an example, and the content providing screen 400 is not necessarily limited to this example.

In addition, the content provided in the server may have only one image quality, or the content providing screen 400 may be individually provided corresponding to each image quality. In this case, only one image quality is selectable by a user through the content providing screen 400. Therefore, only one image-quality corresponding preview button 470 for selecting an image-quality corresponding preview is displayed in this case. When a user selects the image-quality corresponding preview button 470, the display apparatus transmits a request for preview content, which has an image quality indicated by the image-quality corresponding preview button 470, to the server. When the requested preview content is received from the server, the display apparatus processes the preview content and displays the preview image. In this regard, a display form of the preview image will be described later.

When the content includes a plurality of image qualities, an option of selecting the preview is different from the above described embodiment. In this regard, descriptions will be given in the following embodiment.

Figure 5:
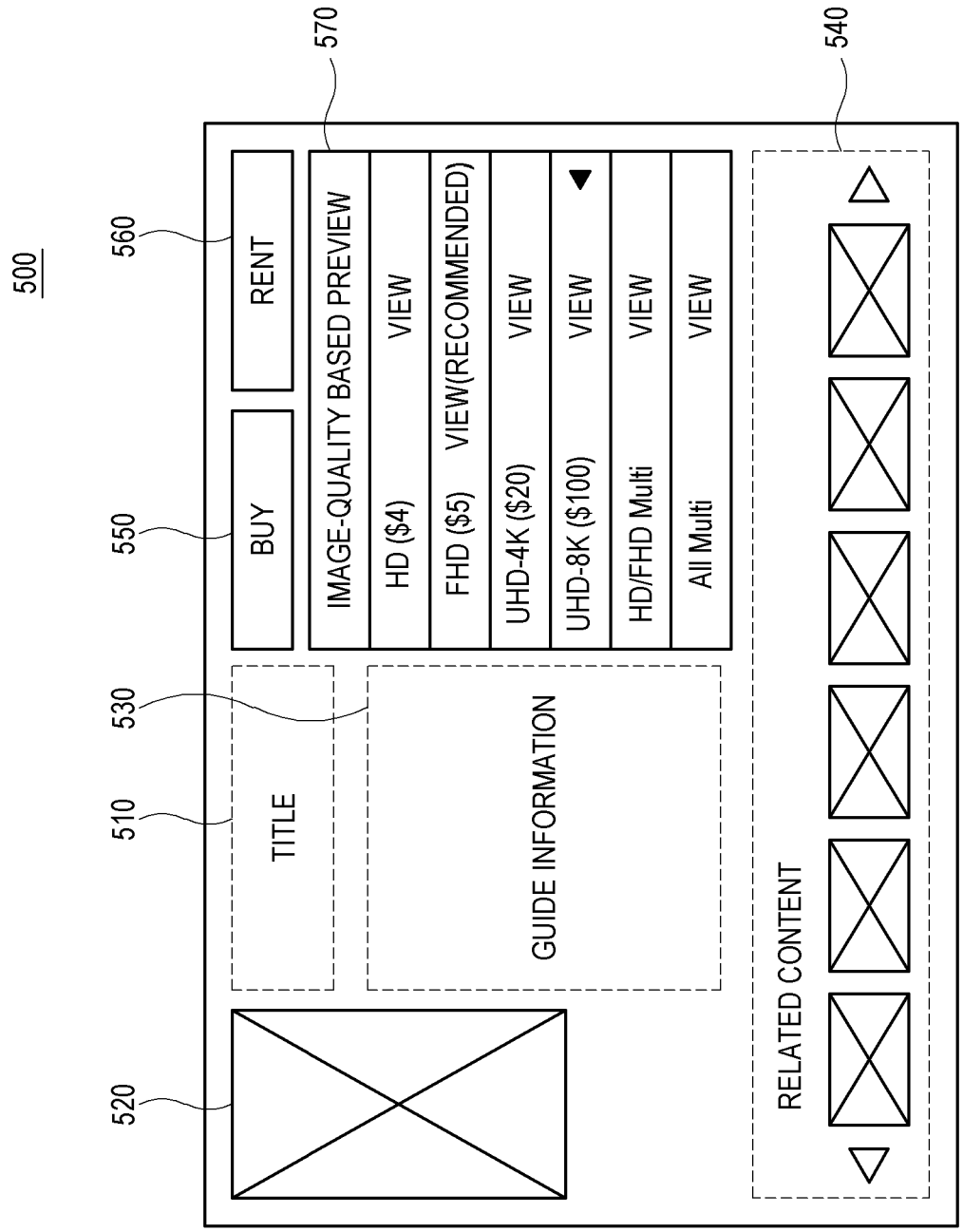
FIG. 5 illustrates another content providing screen displaying options for selecting previews corresponding to a plurality of image qualities in a display apparatus according to an embodiment.

FIG. 5 illustrates another content providing screen displaying options for selecting previews corresponding to a plurality of image qualities in a display apparatus according to an embodiment.

As shown in FIG. 5, a content providing screen 500 includes a title 510 of content, screen information 520 from the content, guide information 530 of the content, related-content guide information 540, etc. These configurations are substantially the same as those of the foregoing embodiment. However, the content providing screen 500 includes a menu 570 showing various image qualities associated with the content, which is different from that of the foregoing embodiment.

Through the menu 570, each preview having different image qualities may be selected. For example, the menu 570 allows a user to select one of the previews respectively having the image qualities of HD, FHD, UHD-4K, and UHD-8K levels, and shows prices of original content according to the image qualities. A user may select one of these image qualities, so that a preview image can be displayed based on content having the selected image quality.

Further, the menu 570 may additionally give optimized information related to the content provided corresponding to the display apparatus by the server. For example, the content is varied in price depending on the plurality of image qualities, and higher image quality is more expensive. The server may guide a user by showing "recommended" or the like information to the option for the preview of the content identified as suitable for the reproduction of the display apparatus, based on previously collected information about content reproducing environments of the display apparatus. An embodiment in which the server collects information about the content reproducing environments of the display apparatus will be described later.

The preview options provided in the menu 570 according to the image qualities may be selected to display preview images corresponding to the respective image qualities. When a user selects the FHD level in the menu 570, the display apparatus transmits a request for the preview content of the FHD level to the server and processes the preview content of the FHD level received from the server to display the preview image of the FHD level.

Furthermore, the menu 570 may provide options for selecting not only the preview image corresponding to one image quality, but also the preview image corresponding to one image quality together with the preview images corresponding to another image quality. For example, when "HD/FHD Multi" option is selected in the menu 570, the display apparatus may transmit a request for both preview contents of the HD level and the FHD level to the server. The display apparatus may receive the preview content of the HD level and the preview content of the FHD level from the server, and display the preview image of the HD level and the preview image of the FHD level on one screen.

Here, the preview content may stream from the server to the display apparatus in real time, or may be transmitted as an independent file to the display apparatus. The display apparatus may process and display the preview content streaming from the server, or download and store a preview content file.

Further, when "All Multi" option is selected in the menu 570, the display apparatus may transmit a request for all preview contents of the HD, FHD, UHD-4K and UHD-8K levels to the server. When all the preview contents is received from the server, the display apparatus may display the preview images respectively corresponding to the HD, FHD, UHD-4K and UHD-8K levels on one screen.

Below, the preview image displayed in the display apparatus as a user selects one of the options in the menu 570 will be described.

Figure 6:
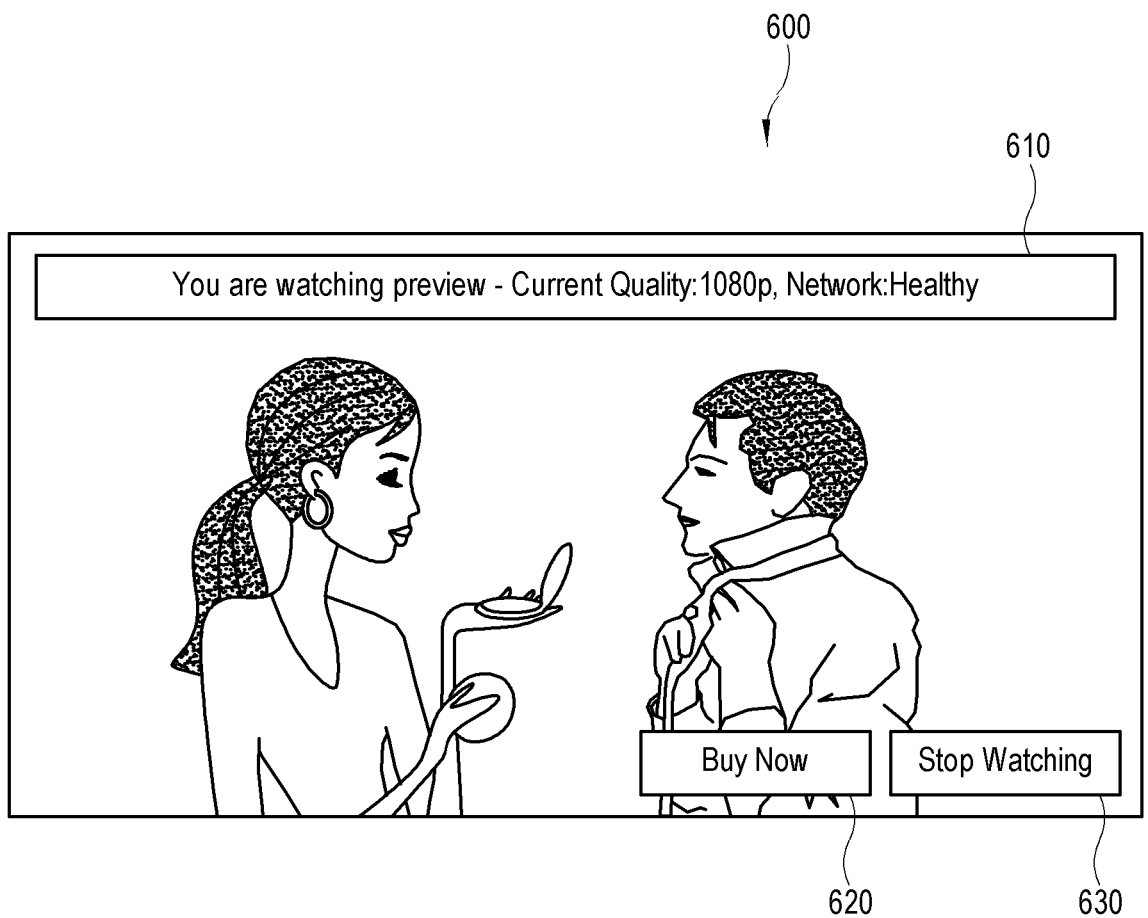
FIG. 6 illustrates a preview image corresponding to one image quality displayed in a display apparatus according to an embodiment.

FIG. 6 illustrates a preview image corresponding to one image quality displayed in a display apparatus according to an embodiment.

As shown in FIG. 6, when a user selects a content preview corresponding to one image quality, for example, the image quality of the FHD level, the display apparatus may obtain the preview content of the FHD level from the server and display a preview image 600 corresponding to the FHD level. Here, the preview image 600 may be displayed based on a preset screen size. The preview image 600 may be displayed using a full screen with respect to an effective displayable area of the display apparatus.

Here, an original content provided by the content streaming service may also provide original content at a plurality of different image qualities. According to an embodiment, the preview image 600 may be provided to allow a user to visually experience an image quality prior to purchasing the content or receiving a streaming service of the content, so that the user may appropriately determine the purchase of the content or the streaming of the content. Because it is advantageous in terms of a user's experience that the preview image 600 is displayed as identically to an original size of the content as possible, the preview image 600 is displayed using the full screen.

Further, the display apparatus may be previously set to display the preview image 600 together with additional objects, such as appended information 610 related to the preview image 600, a purchase button 620 provided to purchase the original content corresponding to the preview image 600, a stop button 630 provided to stop displaying the preview image 600, etc. When a user selects the purchase button 620, the display apparatus switches over to a screen prepared for purchasing the original content. When a user selects the stop button 630, the display apparatus stops displaying the preview image 600 and switches the preview image 600 over to a previous image or a separately designated image.

Here, the objects 610, 620 and 630 are displayed on top of the preview image 600. To minimize interference with the preview image 600, the objects 610, 620 and 630 may be arranged close to the edges of the preview image 600 or may be configured to be displayed at proper transparency. Further, the objects 610, 620 and 630 may be set by a user to be displayed or not to be displayed.

The appended information 610 may include, for example, a message informing that the currently displayed image is the preview image 600, and information about the image quality of the preview image 600 and a state of a network through which the preview content 600 is streaming. The appended information 610 may include information related to the preview content 600 or the original content, or information related to content reproducing environments of the display apparatus.

Below, a multi-view of preview contents according to different image qualities selected by a user will be described.

Figure 7:
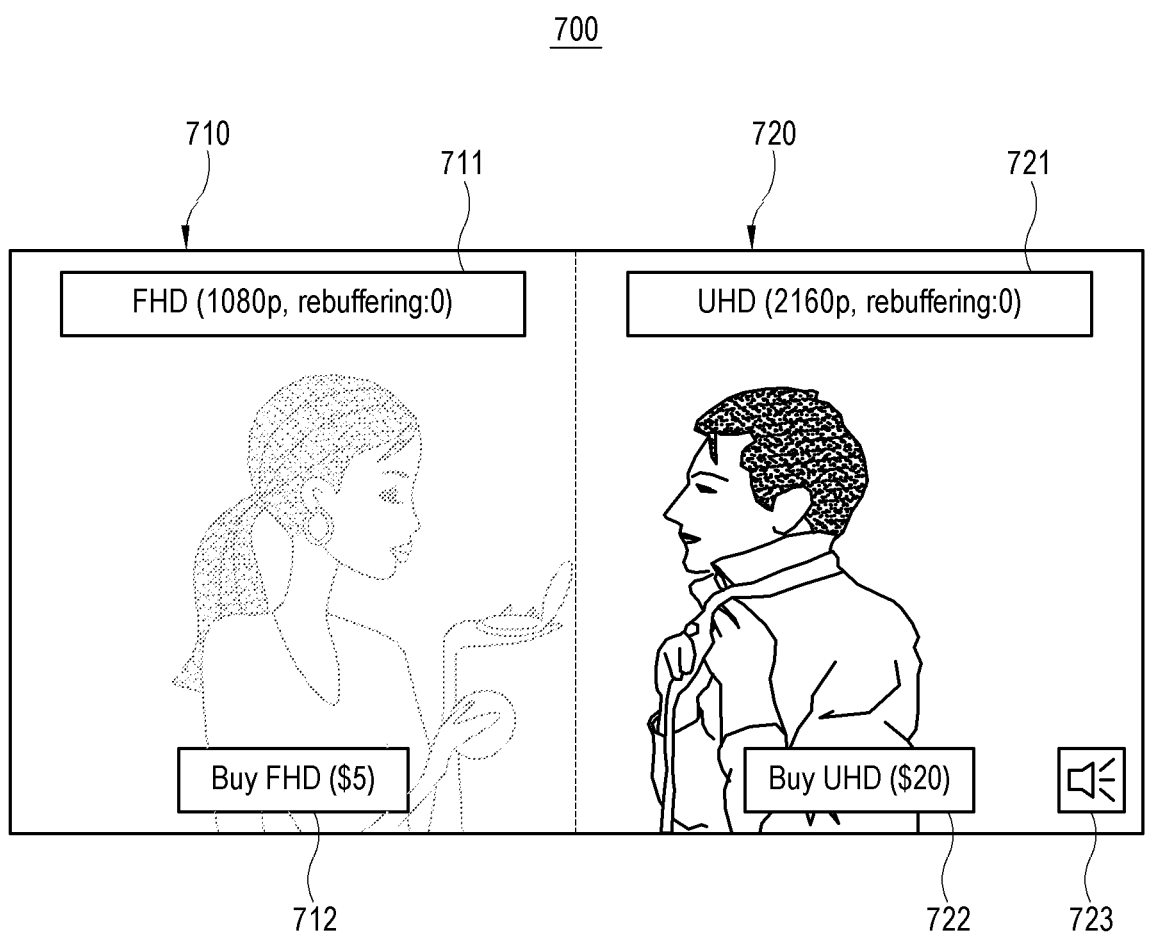
FIG. 7 illustrates preview images corresponding to two different image qualities displayed in a display apparatus according to an embodiment.

FIG. 7 illustrates preview images corresponding to two different image qualities displayed in a display apparatus according to an embodiment.

As shown in FIG. 7, for example, when a user selects a preview content of two different image qualities corresponding to the FHD level and the UHD-4K level, the display apparatus may display a preview image 700 based on the user selection. The preview image 700 may be divided into a plurality of areas corresponding the number of image qualities selected by the user. According to this embodiment, the preview image 700 is divided into two areas: a first area and a second area. All the divided areas may constitute the full screen.

The display apparatus may assign preview contents of selected image qualities to the divided areas, and display a part of the image based on the assigned preview content on each of the corresponding divided areas.

In other words, a first preview image 710 having an FHD-level image quality may be displayed on a first area of the preview image 700, and a second preview image 720 having a UHD-4K-level image quality may be displayed on a second area of the preview image 700. As such, the display apparatus may display the preview image 700 by individually processing a first area part of the original first preview image 710 and a second area part of the original second preview image 720. Therefore, the preview image 700 is displayed by matching image edges of the first preview image 710 and the second preview image 720 in a dividing line therebetween. For example, when the first area of the preview image is a left area and the second area is a right area, the display apparatus displays the left area of the original first preview image 710 and the right area of the original second preview image 720 to complete the preview image 700. In other words, the preview image 700 may display a complete view of the preview image 700 by displaying the first preview image 710 on the left area and the second preview image 720 in the right area, where the first preview image 710 has a different image quality from the second preview image 720. Alternatively, the first preview image 710 and the second preview image 720 may be the same complete preview image displayed on the respective areas of the screen displayed simultaneously at different image qualities.

Because both the first preview image 710 and the second preview image 720 are displayed when a user views the preview image 700, it is possible to compare the image quality of the FHD level and the image quality of the UHD-4K level at a glance. Thus, the preview image 700 gives a user clearer example for comparison between the image qualities.

In this embodiment, the preview images 710 and 720 of two image qualities are divisionally displayed left and right on the full screen. Alternatively, there are no limits to a method of dividing the full screen. For example, the full screen may be divided into the upper portion and the lower portion of the screen, or may be divided into a matrix form of 2 by 2 when preview images of four image qualities are displayed.

Further, the preview image 700 may be displayed together with additional objects, such as appended information 711 and 721 respectively related to the preview images 710 and 720, and purchase buttons 712 and 722 provided to purchase original contents corresponding to the respective preview images 710 and 720, etc. The appended information 711 and 721 may include various pieces of information, such as information about the image qualities of the preview images 710 and 720, rebuffering information about the number of times that buffering occurs while the preview content is reproduced, etc. In addition, the purchase buttons 712 and 722 may give a user information about prices of the original content corresponding to image qualities.

When the preview image 700 is displayed as two different preview images, the display apparatus may output a sound of each of the preview images 710 and 720. However, the sound needs to be processed differently from the image. Therefore, when the display apparatus outputs the sounds corresponding to the plurality of preview contents at a time, it may be difficult for a user to distinguish between the sounds of the different preview contents.

Thus, while two preview images 710 and 720 are displayed at a time, the display apparatus outputs the sound corresponding to one selected between the preview images 710 and 720 and does not output the sound of the other one. The display apparatus may display the preview image 720, of which the sound is being output, with a preset interface 723 for indicating the output of the sound, thereby informing a user that the sound is being currently output corresponding to which one of the preview images 710 and 720.

Below, it will be described that the display apparatus displays two preview images by downscaling without dividing the full screen.

Figure 8:
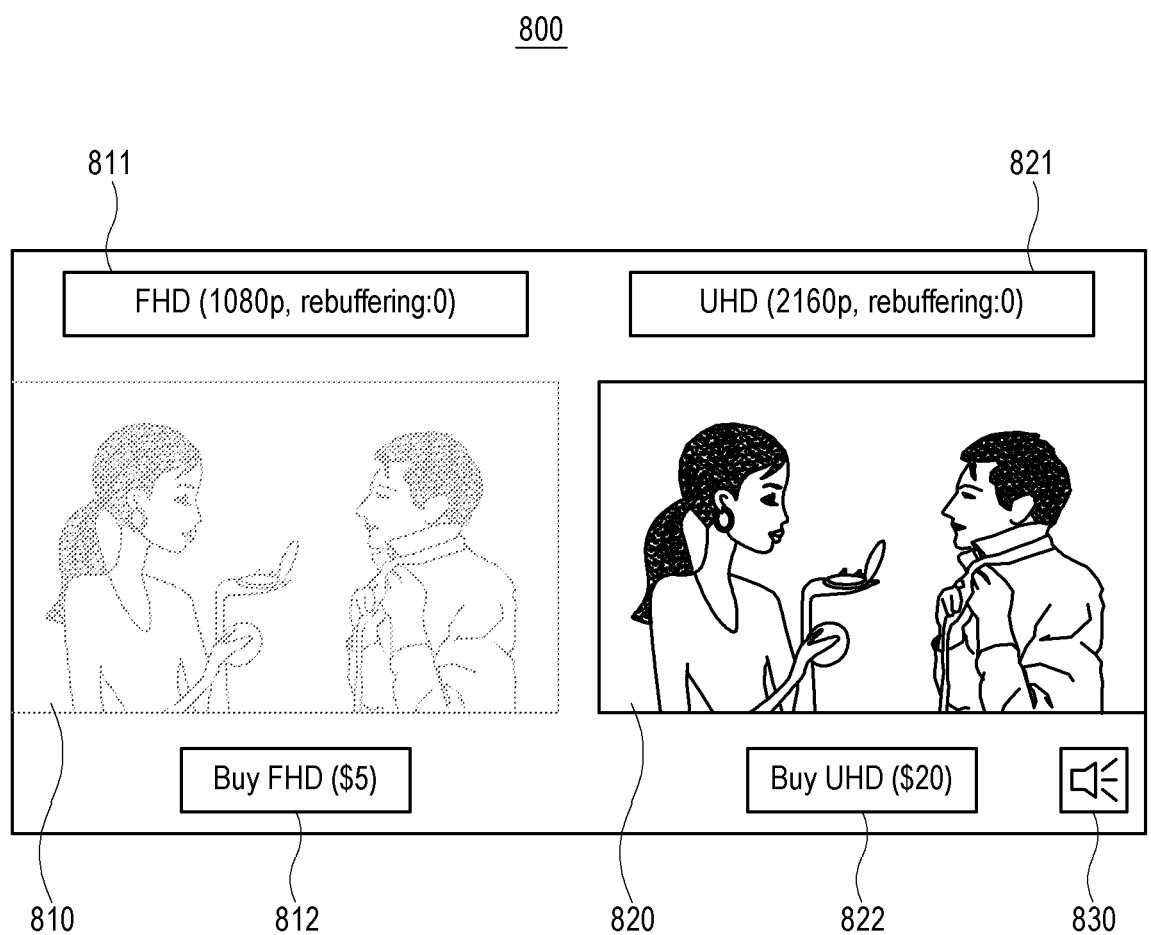
FIG. 8 illustrates downscaled preview images corresponding to two different image qualities displayed in a display apparatus according to an embodiment.

FIG. 8 illustrates downscaled preview images corresponding to two different image qualities displayed in a display apparatus according to an embodiment.

As shown in FIG. 8, the display apparatus may display a first preview image 810 and a second preview image 820 at a time on a preview screen 800. In the foregoing embodiment, a part of the first preview image and a part of the second preview image are combined to be displayed using the full screen. On the other hand, the display apparatus according to an embodiment may reduce the sizes of the first preview image 810 and the second preview image 820, and thus, the display apparatus may display both the entire first preview image 810 and the entire second preview image 820 at a time.

Furthermore, the display apparatus may downscale the first preview image 810 and the second preview image 820 to predetermined resolutions. The display apparatus may apply the same image size or the same downscaling ratio to downscaling for each of the first preview image 810 and the second preview image 820. Referring to FIG. 8, the preview screen 800 is downscaled so that the first preview image 810 and the second preview image 820 have the same screen size, and thus the first preview image 810 and the second preview image 820 may be displayed in the same size, but in different resolutions. Alternatively, when the same downscaling ratio is applied, the second preview image 820 having a higher image quality may be displayed larger than the first preview image 810 in the preview screen 800.

The preview screen 800 may additionally include information 811 related to the first preview image 810, a purchase option button 812 for the first preview image 810, information 821 related to the second preview image 820, a purchase option button 822 for the second preview image 820, etc.

Below, a detailed method of displaying a multi-preview screen including a plurality of preview images will be described.

Figure 9:
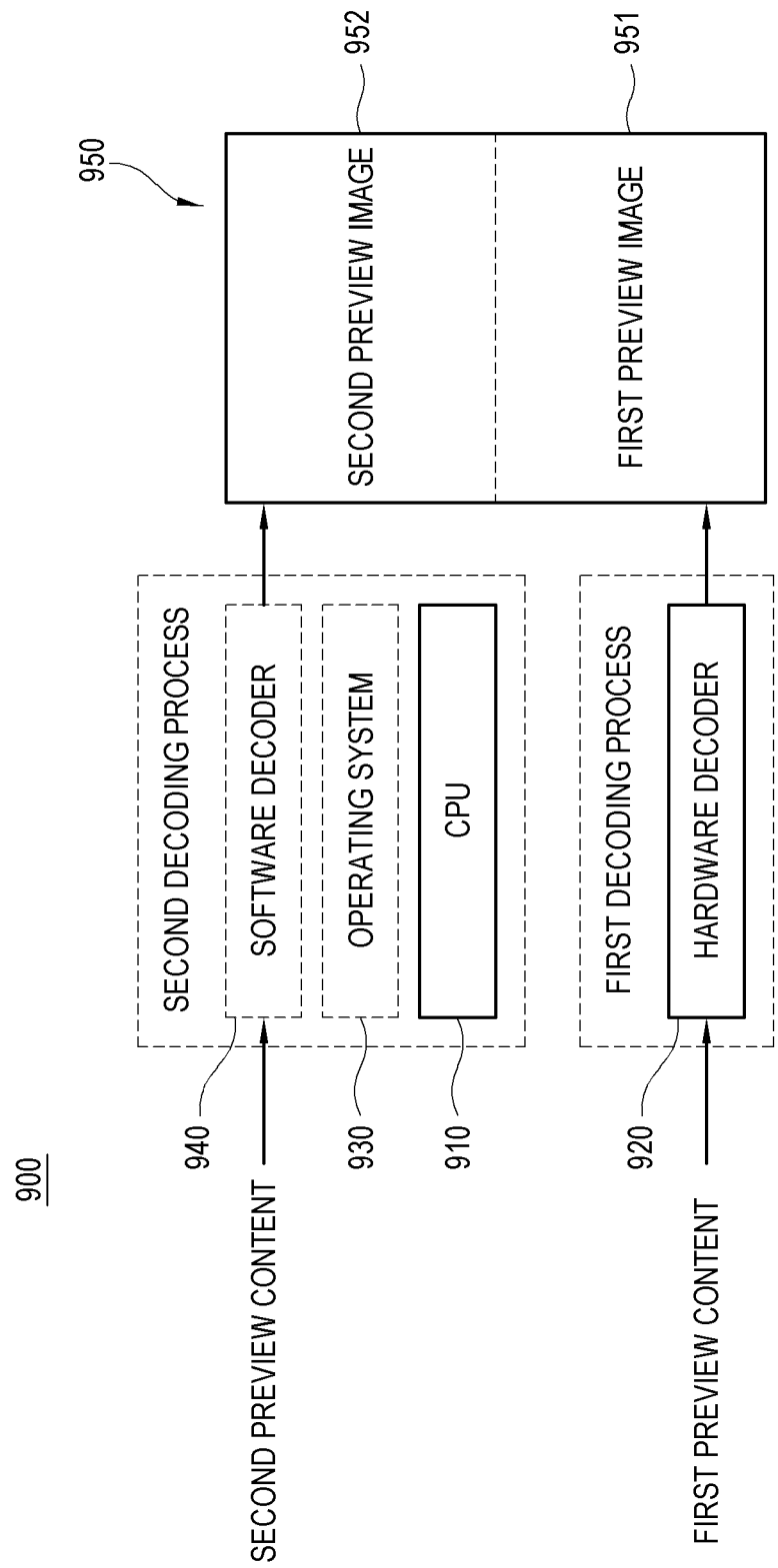
FIG. 9 illustrates a schematic diagram for displaying a multi-preview screen by processing two preview contents in a display apparatus according to an embodiment.

FIG. 9 illustrates a schematic diagram for displaying a multi-preview screen by processing two preview contents in a display apparatus according to an embodiment.

As shown in FIG. 9, a processor of a display apparatus 900 may include a CPU 910 configured to perform overall operation, and a hardware decoder 920 configured to decode an image signal. Typically, the dedicated hardware decoder 920 may be used to process a signal of image content to be displayed as an image.

However, when only one hardware decoder 920 is provided in the display apparatus 900, it may be difficult for the hardware decoder 920 to solely decode both the first preview content and the second preview content simultaneously to display a multi-preview screen 950.

Thus, the display apparatus 900 may perform two decoding processes of a first decoding process and a second decoding process. In the first decoding process, decoding is performed by the hardware decoder 920. In the second decoding process, decoding is performed by a software decoder 940 in the state that an operating system 930 runs on a CPU 910, and an application, e.g., the software decoder 940, may be executed on the operating system 930. The operating system 930 and the software decoder 940 may be stored in the storage of the display apparatus 900. The display apparatus 900 may decode the first preview content by the first decoding process and the second preview content by the second decoding process. Thus, a first preview image 951 and a second preview image 952 may be displayed simultaneously on the multi-preview screen 950.

In certain situations, the hardware decoder 920 may provide better performance than the software decoder 940, and therefore the preview content processed by the first decoding process may have a higher image quality than the preview content processed by the second decoding process.

Below, a method of processing three or more preview contents will be described.

Figure 10:
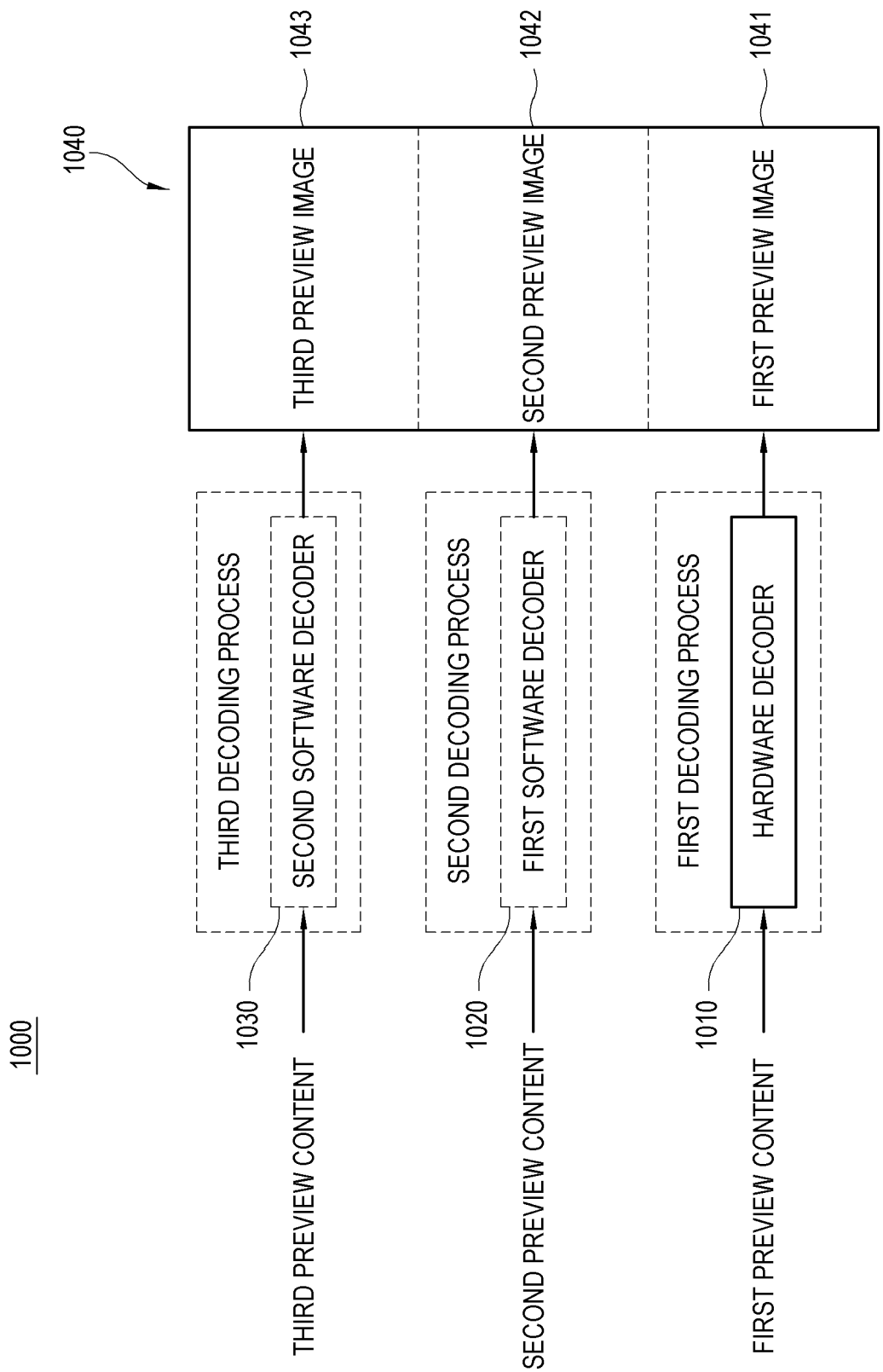
FIG. 10 illustrates a schematic diagram for displaying a multi-preview screen by processing three preview contents in a display apparatus according to an embodiment.

FIG. 10 illustrates a schematic diagram for displaying a multi-preview screen by processing three preview contents in a display apparatus according to an embodiment.

As shown in FIG. 10, when the display apparatus 1000 includes only one hardware decoder 1010, but needs to process three or more preview contents, the display apparatus 1000 may perform a plurality of decoding processes based on software decoders 1020 and 1030. However, the number of software decoders are not limited hereto.

For example, when there are three preview contents, the display apparatus 1000 may execute each of the first software decoder 1020 and the second software decoder 1030 on the operating system. The display apparatus 1000 may perform the first decoding process based on the hardware decoder 1010, the second decoding process based on the first software decoder 1020, and the third decoding process based on the second software decoder 1030. Thus, a first preview image 1041, a second preview image 1042, and a third preview image 1043 may be displayed simultaneously on a multi-preview screen 1040. However, the decoding process is not limited hereto. For example, there may be a plurality of hardware decoders and a plurality of software decoders depending on the need.

Below, it will be described that the display apparatus may display the multi-preview screen based on one hardware decoder without using the software decoder.

Figure 11:
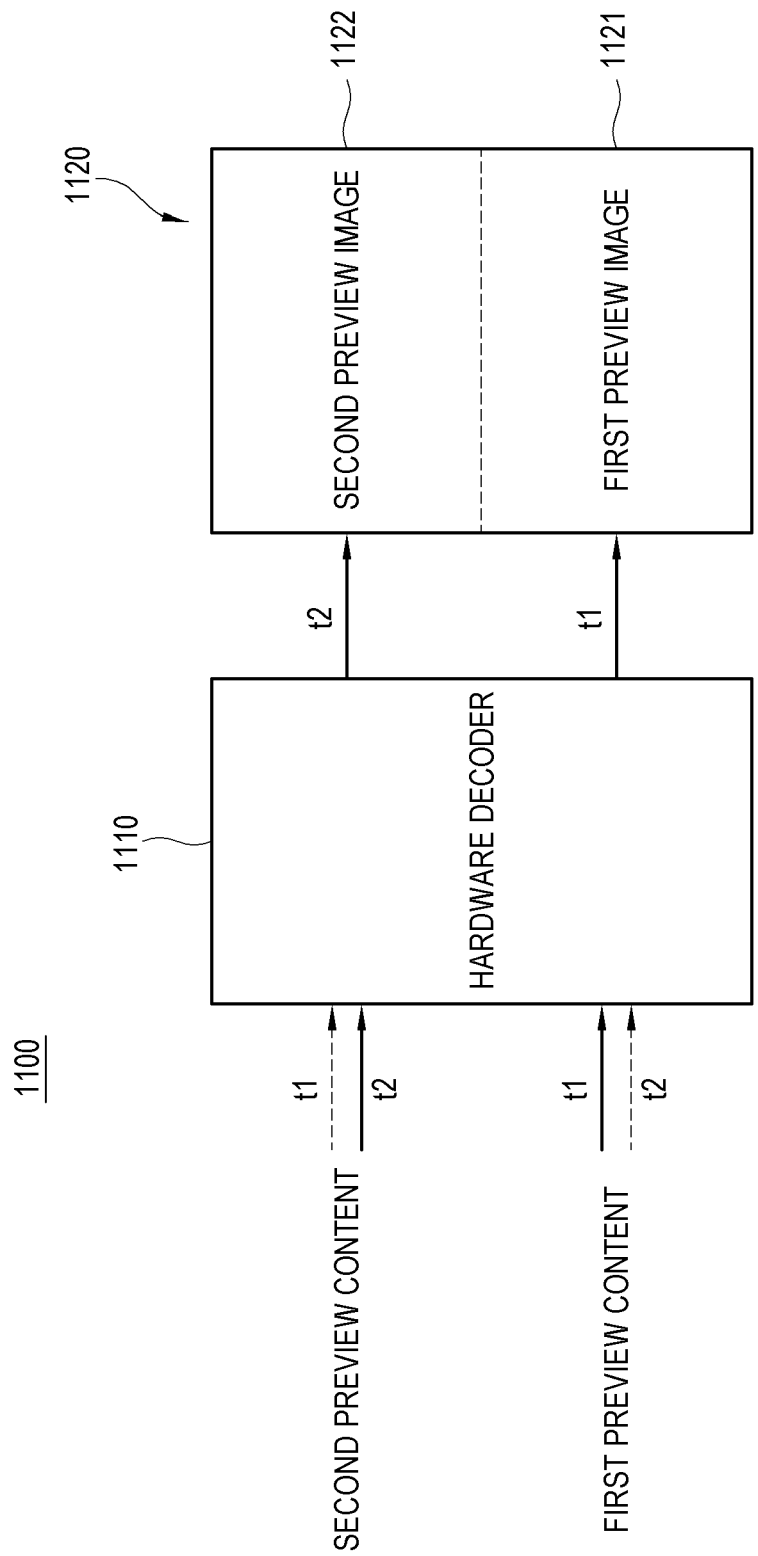
FIG. 11 illustrates a schematic diagram for displaying a multi-preview screen by one hardware decoder in a display apparatus according to an embodiment.

FIG. 11 illustrates a schematic diagram for displaying a multi-preview screen by one hardware decoder in a display apparatus according to an embodiment.

As shown in FIG. 11, a display apparatus 1100 may display a multi-preview screen 1120 based on one hardware decoder 1110 without using the software decoders as shown in the foregoing embodiment. In this case, the hardware decoder 1110 may decode the first preview content and the second preview content.

For example, for a period of time t1, the hardware decoder 1110 may decode the first preview content to reproduce a first preview image 1121, and does not decode the second preview content. Meanwhile, for a period of time t2 different from the period of time t1, the hardware decoder 1110 may decode the second preview content to reproduce the second preview image 1122, and does not decode the first preview content. The hardware decoder 1110 may periodically automatically perform such a decoding process or may decode the content alternatively in response to a user's selection.

Thus, the multi-preview screen 1120 may alternatively display the second preview image 1122 while the first preview image 1121 is stopped, or display the first preview image 1121 while the second preview image 1122 is stopped. When the performance of the hardware decoder 1110 is high enough to perform multiple decoding processes, the display apparatus may simultaneously display the first preview image 1121 and the second preview image 1122 in the multi-preview screen 1120.

Furthermore, the display apparatus may be designed to include a plurality of hardware decoders.

Figure 12:
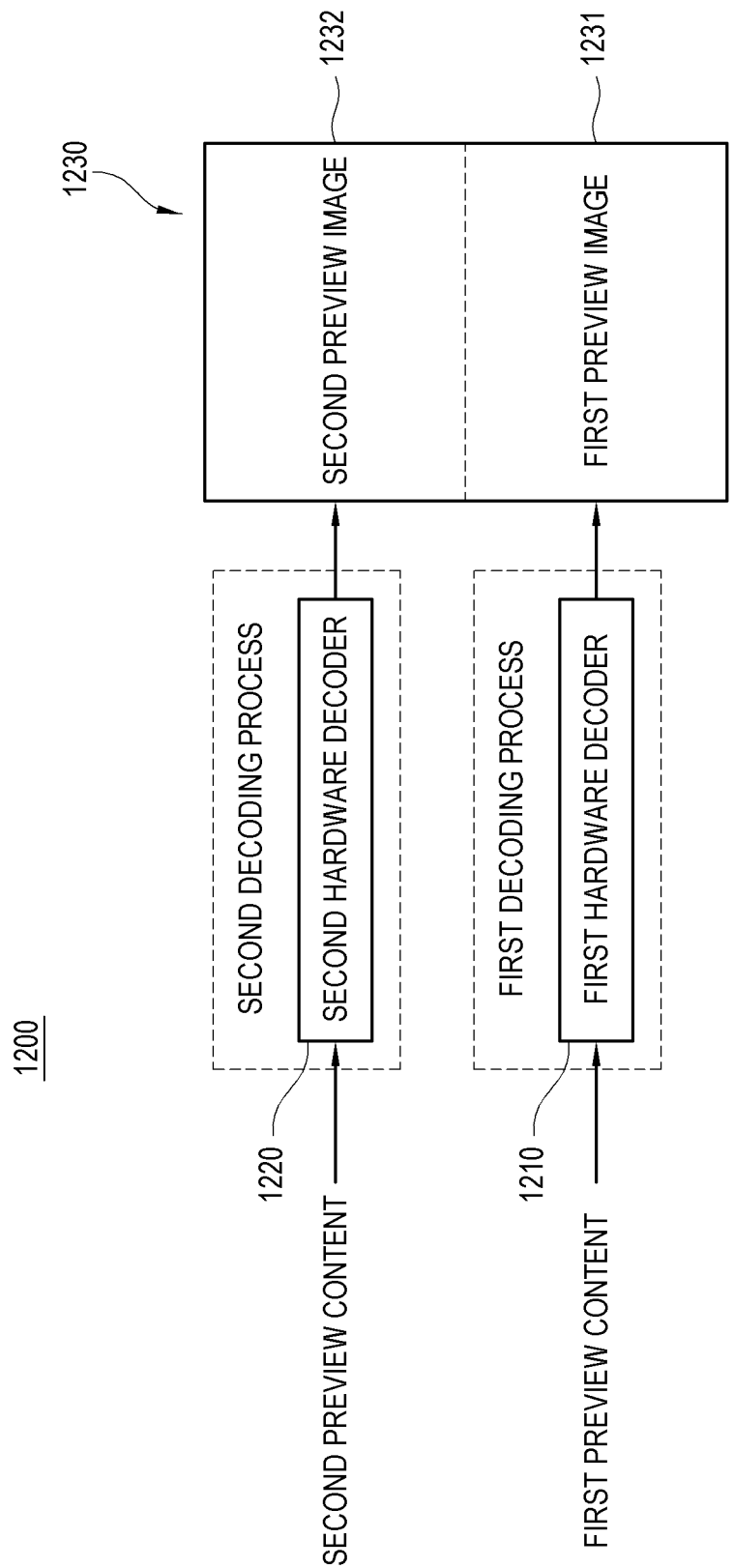
FIG. 12 illustrates a schematic diagram for displaying a multi-preview screen by two hardware decoders in a display apparatus according to an embodiment.

FIG. 12 illustrates a schematic diagram for displaying a multi-preview screen by two hardware decoders in a display apparatus according to an embodiment.

As shown in FIG. 12, the display apparatus 1200 may include a first hardware decoder 1210 and a second hardware decoder 1220. Therefore, when there are two preview contents selected by the user, they may be separately processed by the hardware decoders 1210 and 1220.

The display apparatus 1200 may perform the first decoding process based on the first hardware decoder 1210 and the second decoding process based on the second hardware decoder 1220. The display apparatus 1200 may decode the first preview content by the first decoding process and the second preview content by the second decoding process, and display a multi-preview screen 1230 in which the first preview image 1231 and the second preview image 1232 may be reproduced.

When there are three preview contents to be processed, the display apparatus 1200 may include an additional decoding process based on a software decoder as described in the foregoing embodiments.

Meanwhile, the preview content may be provided by the server, and the server may use various methods to generate the preview content. Below, it will be described that the server may generate the preview content.

Figure 13:
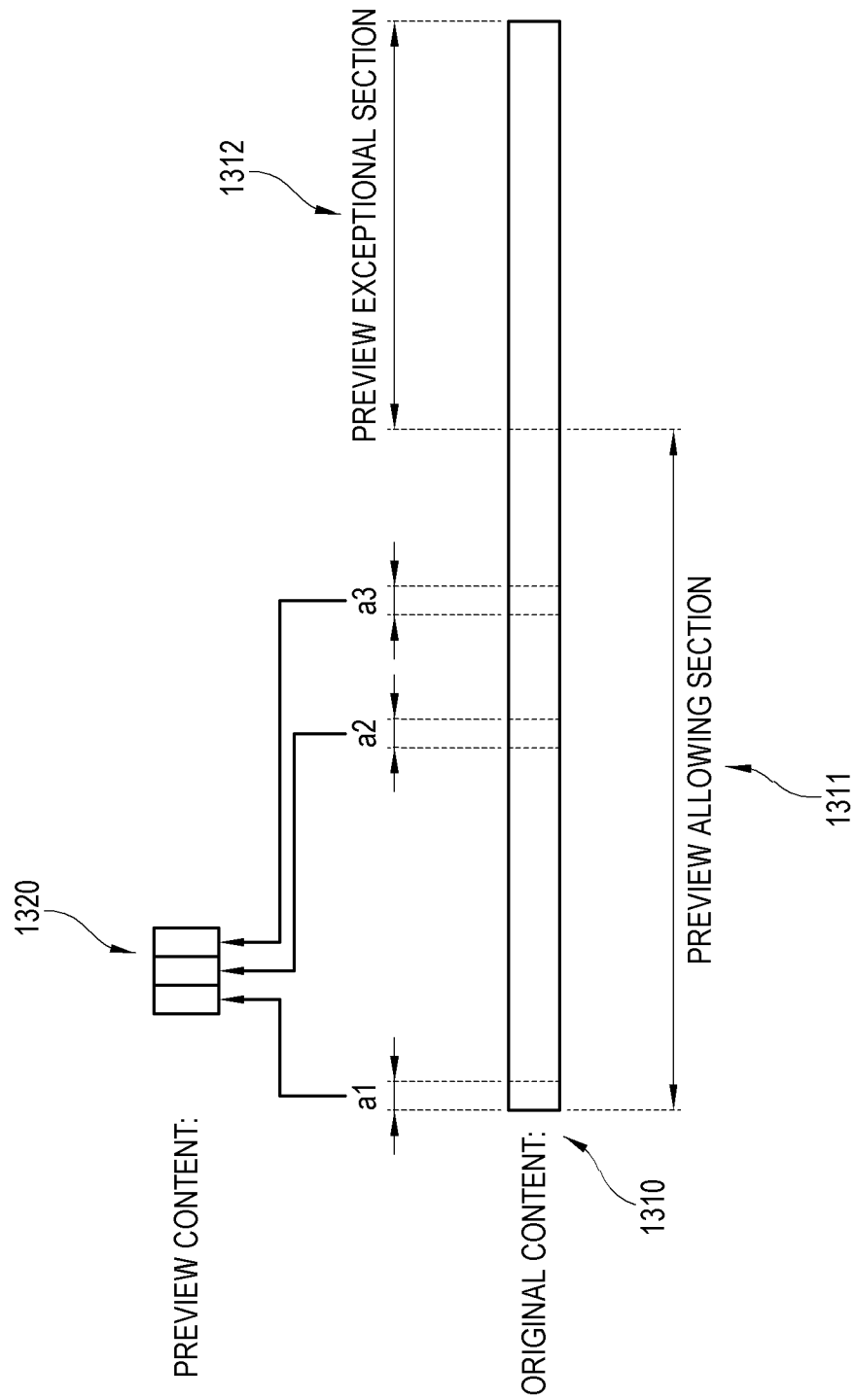
FIG. 13 illustrates a method of generating preview content from original content in a server according to an embodiment.

FIG. 13 illustrates a method of generating a preview content from an original content in a server according to an embodiment.

As shown in FIG. 13, the server may generate preview content 1320 by extracting a partial section from the whole original content 1310. The server may generate and store the preview content 1320 as a file separated from the original content 1310. In this case, the server generates and stores the file of the preview content 1320 before the display apparatus requests a preview, and transmits the stored file of the preview content 1320 to the display apparatus when receiving the preview request from the display apparatus.

Alternatively, the server may not separately generate the file of the preview content 1320, but reproduce and stream a partial section of the original content 1310 in response to the preview request. In this case, the server does not have to allocate a storage space for storing the file of the preview content 1320 apart from a memory.

The server may designate a partial section for the preview content 1320 in the whole original content 1310 in advance, so that the designated sections of the preview content may be streamed to the display apparatus. For example, when reproducing sections a1, a2 and a3 that are previously designated in the original content 1310, the server may reproduce and stream only the reproduction sections a1, a2 and a3 of the original content 1310.

Alternatively, the server may not previously designate a reproducing section for the preview content 1320, but randomly select and reproduce a section from the whole original content 1310. However, a part of the original content 1310, which may not be published in a preview stage, may be designated as a preview exceptional section 1312. The preview exceptional section 1312 may refer to, for example, a section that may be a spoiler, or a section that may be a climax or an ending of a story, and therefore, may be excluded from the sections to be randomly selected for the preview content 1320 by the server.

The server may randomly select a preview content in a preview allowing section 1311 of the original content 1310 except for the preview exceptional section 1312, and reproduce and stream the selected preview content 1320 to the display apparatus.

As such, the server may generate and provide the preview content 1320 from the original content 1310 to the display apparatus.

Below, a method of providing preview contents by the server will be described.

Figure 14:
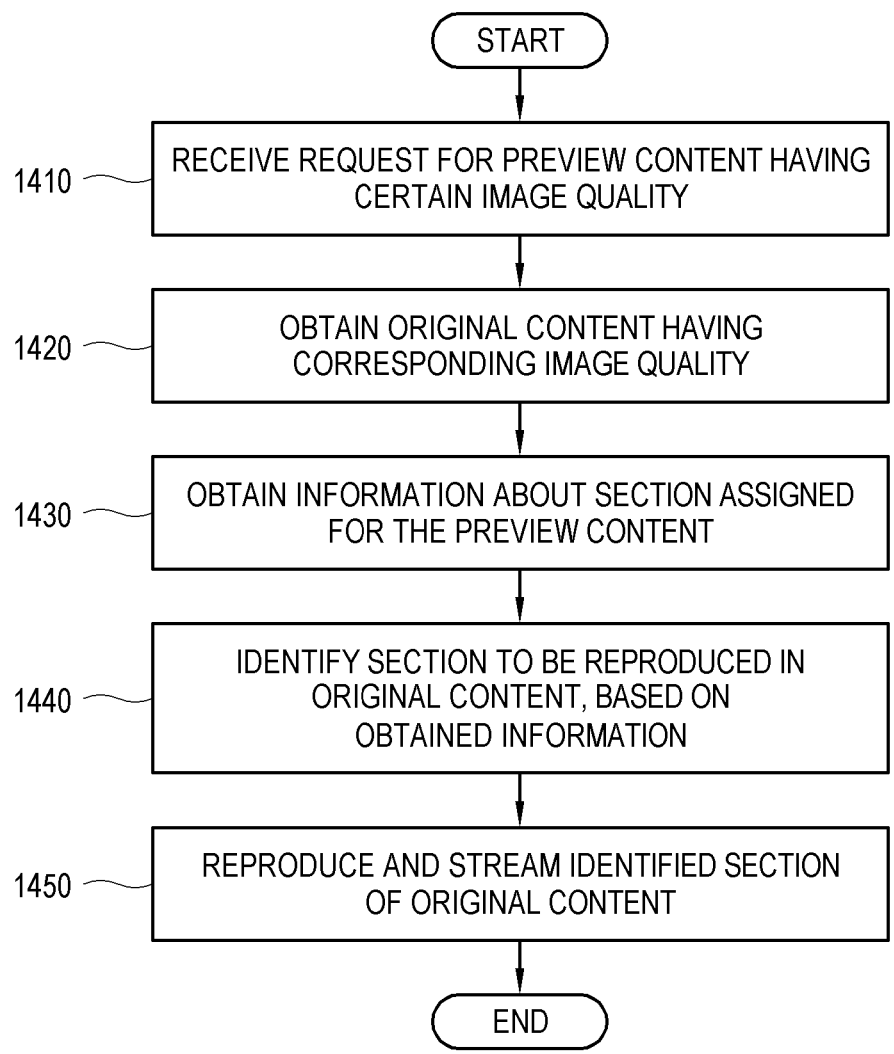
FIG. 14 illustrates a flowchart of providing preview content in a server according to an embodiment.

FIG. 14 illustrates a flowchart of providing preview content in a server according to an embodiment.

As shown in FIG. 14, the following operations are carried out by the server.

In operation 1410, the server receives a request for preview content having a certain image quality from the display apparatus.

In operation 1420, the server obtains original content having the corresponding image quality in response to the request.

In operation 1430, the server obtains information about a section assigned for the preview content. This information may include sections (for example, a1, a2 and a3 in FIG. 13) may be directly assigned for the preview in the original content, or a range of a section may be assigned to be randomly selected (for example, preview allowing section 1311 in FIG. 13).

In operation 1440, the server identifies the section to be reproduced in the original content, based on the obtained information.

In operation 1450, the server reproduces and streams the identified section of the original content.

Furthermore, the server may collect information about the display apparatus, and allow the display apparatus to display the preview image together with information, which helps a user, based on the collected information. Below, it will be described that the server collects information about a content reproducing environment of the display apparatus from the display apparatus and utilizes the collected information.

Figure 15:
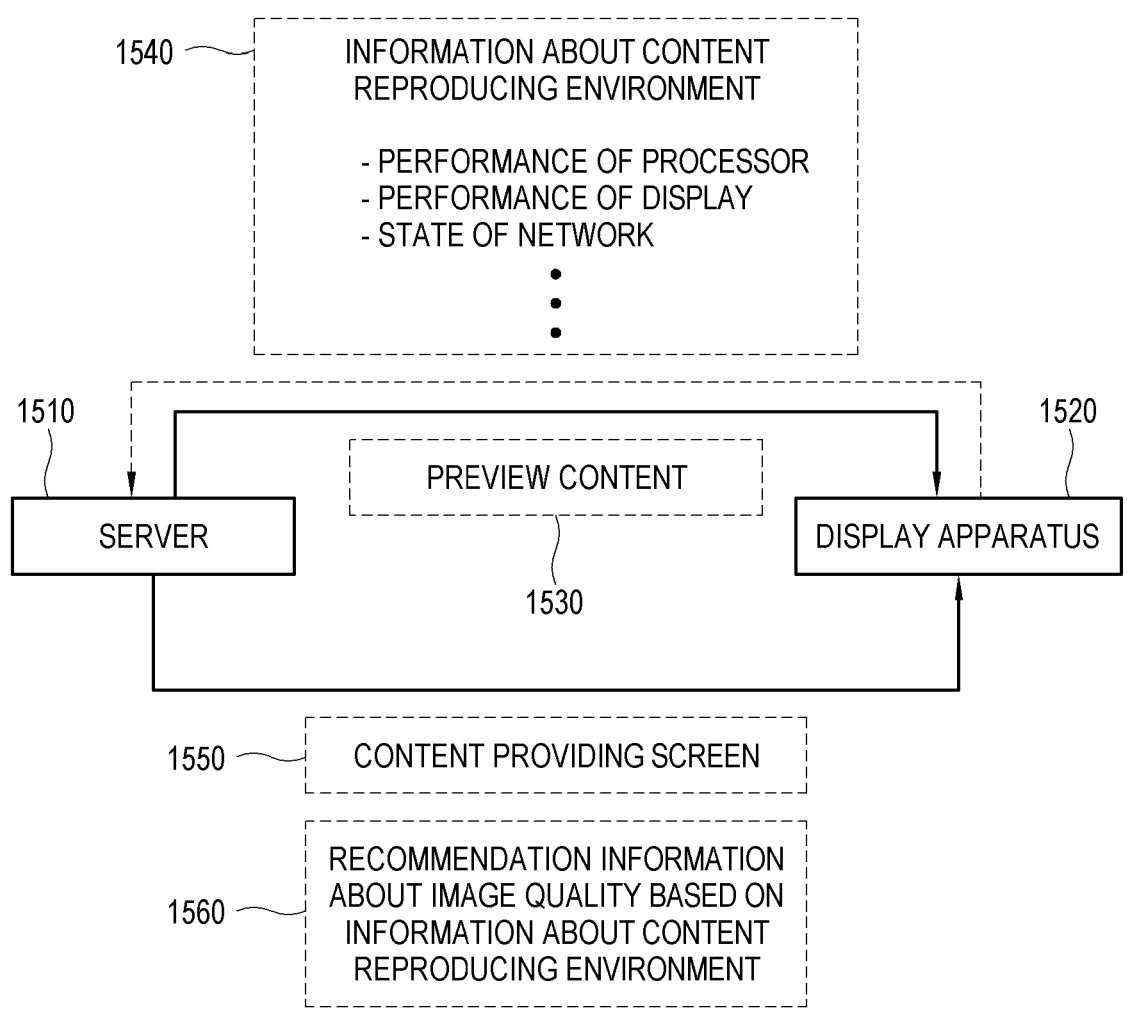
FIG. 15 illustrates a method of providing information optimized for a display apparatus by a server, based on information collected from a display apparatus according to an embodiment.

FIG. 15 illustrates a method of providing information optimized for a display apparatus by a server, based on information collected from a display apparatus according to an embodiment.

As shown in FIG. 15, a server 1510 may collect information 1540 about a content reproducing environment of a display apparatus 1520, while providing preview content 1530 to the display apparatus 1520. The server 1510 may automatically collect the information 1540 when it is previously set to allow a user to collect information. Alternatively, the server 1510 may display a user interface (UI) of requesting a user to give consent to the collection of the information before entering the preview screen of the foregoing embodiment, and collect the information 1540 when the consent to the collection of the information is given through the UI.

The information 1540 about the content reproducing environment of the display apparatus 1520 shows an environmental condition under which the display apparatus 1520 receives and reproduces content. For example, the environmental condition may include the performance of the display apparatus 1520, and a network state between the server 1510 and the display apparatus 1520. Furthermore, this information may also include processor performance of the display apparatus 1520 reproducing the content, display performance of the display apparatus 1520 displaying the content, a streaming speed of the content through the network, an error rate of content data while the content is streaming, etc. The server 1510 may communicate with the display apparatus 1520 while the preview content 1530 is streaming, and obtain the information 1540.

Based on the obtained environmental information 1540, the server 1510 may provide information 1560, which recommends an image quality optimized for the display apparatus 1520. The server 1510 may provide information 1560 when a content providing screen 1550 is provided to the display apparatus 1520. For example, the server 1510 may provide the preview content, which has the highest image quality allowable within the processor performance and the display performance of the display apparatus 1520, on the content providing screen 1550. Alternatively, the server 1510 may calculate or determine a transfer rate per unit time while streaming the preview content to the display apparatus 1520, and provide the preview, which has the highest image quality within a range of the determined result that is lower than a threshold, on the content providing screen 1550. In other words, based on the determined transfer rate of the streaming the preview content, the server may provide the highest image quality available within a preset threshold.

When the display of the display apparatus 1520 supports the maximum resolution up to the FHD level, the server 1510 may recommend preview content having an image quality of the FHD level on the content providing screen 1550. When it is identified that the data transfer rate is low at a current point in time even though the processor performance and display performance of the display apparatus 1520 are enough to process content having an image quality of the UHD level, the server 1510 may recommend preview content having an image quality of the FHD level lower than the UHD level.

As such, the server 1510 may give recommendation information 1560 about an image quality corresponding to the content reproducing environment of the display apparatus 1520 to the display apparatus 1520. A user of the display apparatus 1520 may easily select preview or original content having a desired image quality, based on the recommendation information 1560 displayed on the content providing screen 1550.

The operations of the apparatus described in the embodiments herein may be performed by artificial intelligence (AI) provided in the corresponding apparatus. The AI may be applied to various general systems by utilizing a machine learning algorithm. Here, the AI system may refer to a computer system with intelligence of a human being or capable of performing functions of a human brain. In such a system, the system may autonomously perform learning to improve accuracy of recognition and identification based on accumulated experiences. The AI is based on elementary technology by utilizing machine learning (deep-learning) technology and algorithms based on an algorithm of autonomously classifying and learning features of input data, and copying perception, identification and the like functions of a human brain.

The elementary technology may include, for example, at least one of language comprehension technology for recognizing a language and a text of a human, visual understanding technology for recognizing an object, like a human sense of vision, inference and prediction technology for identifying information and logically making inference and prediction, knowledge representation technology for processing experience information of a human into knowledge data, and motion control technology for controlling a vehicle's automatic driving or a robot's motion.

Here, linguistic comprehension may refer to technology of recognizing, applying and processing a human language or text, and include natural language processing, machine translation, conversation system, question and answer, voice recognition and synthesis, etc.

Inference and prediction may refer to technology of identifying information and logically making prediction, and may include knowledge and probability based inference, optimized prediction, preference-based plan, recommendation, etc.

Knowledge representation may refer to technology of automating human experience information into knowledge data, and may include knowledge building such as data creation and classification, knowledge management such as data utilization, etc.

The methods according to the embodiments herein may be achieved in the form of a program command that may be implemented in various computers, and recorded in a computer readable medium. Such a computer readable medium may include a program command, a data file, a data structure or the like, or combination thereof. For example, the computer readable medium may be stored in a volatile or nonvolatile storage, such as a read only memory (ROM) or the like, regardless of whether data stored is rewritable, for example, a RAM, a memory chip, a device or integrated circuit (IC) or the like memory, or an optically or magnetically recordable or machine (e.g., a computer-readable storage medium, for example, a compact disk (CD), a digital versatile disk (DVD), a magnetic disk, a magnetic tape or the like). It will be appreciated that a memory, which can be included in a mobile terminal, is an example of the machine-readable storage medium suitable for storing a program having instructions for realizing the embodiments. The program command recorded in this storage medium may be specially designed and configured according to various embodiments, or may be publicly known and available to those skilled in the art.

Although a few embodiments have been shown and described, it will be appreciated by those skilled in the art that changes may be made in these embodiments without departing from the principles and spirit of the disclosure.

What is claimed is:

1. A display apparatus comprising:
a display;
a communicator comprising circuitry configured to communicate with a server;
a user input unit comprising circuitry configured to receive a user input;
a processor configured to:
based on a first user input, control the display to display a menu providing at least one image quality of a preview content that is selectable,
receive a second user input of selecting the at least one image quality of the preview content,
control the communicator to transmit a request for the preview content at the selected image quality to the server, and
control the display to display an image based on the preview content received from the server,
wherein the second user input selects two or more image qualities of the preview content, and the processor is further configured to control the display to display images based on preview contents of the two or more selected image qualities received from the server.

2. The display apparatus according to claim 1, wherein the processor is further configured to control the display to display the image based on the preview content having the selected image quality to be displayed on a full screen.

3. The display apparatus according to claim 1, wherein the processor is further configured to:
divide a screen of the display into a plurality of areas corresponding to a number of the two or more image qualities,
assign the preview contents having the two or more image qualities to the plurality of areas, and control a part of the image based on the assigned preview content to be displayed on each of the plurality of areas.

4. The display apparatus according to claim 1, further comprising a hardware decoder configured to decode a first preview content, wherein
the processor is further configured to drive a software decoder and control the software decoder to decode a second preview content.

5. The display apparatus according to claim 4, wherein the processor is configured to control the hardware decoder to process the first preview content having a relatively higher image quality among a plurality of preview contents.

6. The display apparatus according to claim 1, wherein the processor is further configured to process the preview contents to be alternately decoded.

7. The display apparatus according to claim 1, wherein the processor is further configured to output a sound corresponding to the preview content, and display the preview content with an interface for indicating whether the sound is output.

8. The display apparatus according to claim 1, wherein the processor is further configured to display the menu with guide information about selectable image qualities.

9. The display apparatus according to claim 8, wherein the guide information is generated based on a performance of the display apparatus or a network state between the display apparatus and the server.

10. A method of controlling a display apparatus, comprising:
based on a first user input, displaying a menu providing at least one image quality of a preview content that is selectable,
receiving a second user input of selecting the at least one image quality of the preview content,
transmitting a request for the preview content at the selected image quality, to a server, and
displaying an image based on the preview content received from the server,
wherein the second user input selects two or more image qualities, and
the displaying of the image based on the preview content further comprises displaying images based on preview contents of the two or more image qualities.

11. The method according to claim 10, wherein
the displaying of the image based on the preview content comprises using a full screen to display the image based on the preview content having the selected image quality.

12. The method according to claim 10, wherein the displaying the images based on the preview contents comprises:
dividing a screen of the display into a plurality of areas corresponding to a number of the two or more image qualities,
assigning the preview contents having the two or more image qualities to the plurality of areas, and
controlling a part of the image based on the assigned preview content to be displayed on each of the plurality of areas.

13. The method according to claim 10, wherein the display apparatus further comprises a hardware decoder configured to decode a first preview content, and
wherein the displaying the images based on the preview contents further comprises driving a software decoder to decode a second preview content.

14. The method according to claim 13, further comprising controlling the hardware decoder to process the first preview content having a relatively higher image quality among a plurality of preview contents.

15. The method according to claim 10, further comprising processing the preview contents to be alternately decoded.

16. The method according to claim 10, further comprising:
outputting a sound corresponding to the preview content, and
displaying the preview content with an interface for indicating whether the sound is output.

17. The method according to claim 10, further comprising displaying the menu with guide information about selectable image qualities.

18. The method according to claim 17, wherein the guide information is generated based on performance of the display apparatus or a network state between the display apparatus and the server.

* * * * *